No. 676,452. Patented June 18, 1901.
J. H. TOOLE.
APPARATUS FOR APPLYING TAPED OR WIRED TIRES TO CHANNELED VEHICLE WHEELS.
(Application filed Sept. 10, 1900.)
(No Model.) 2 Sheets—Sheet 1.
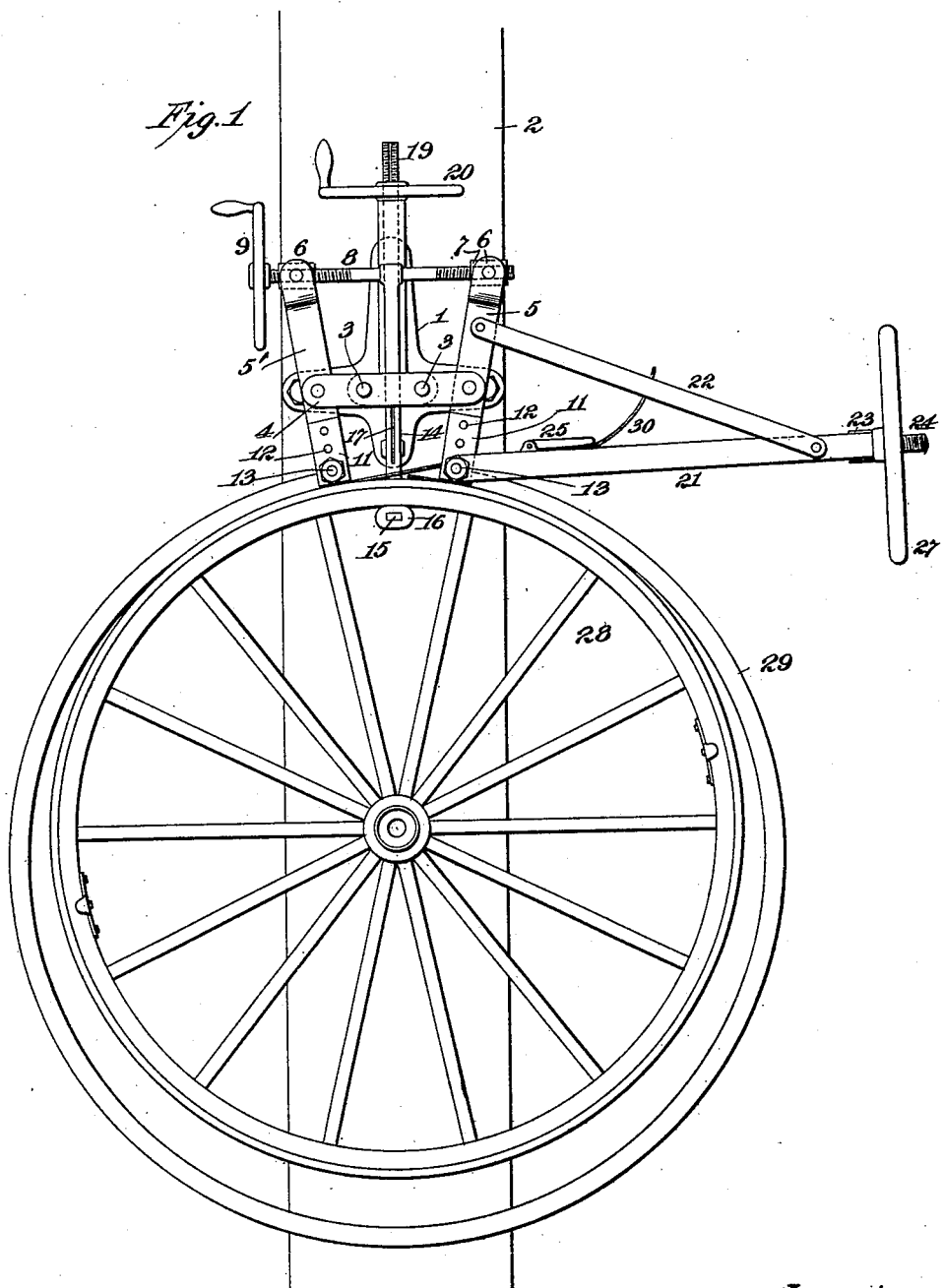
Witnesses:
Inventor No. 676,452. Patented June 18, 1901.
J. H. TOOLE.
APPARATUS FOR APPLYING TAPED OR WIRED TIRES TO CHANNELED VEHICLE WHEELS.
(Application filed Sept. 10, 1900.)
(No Model.) 2 Sheets—Sheet 2.
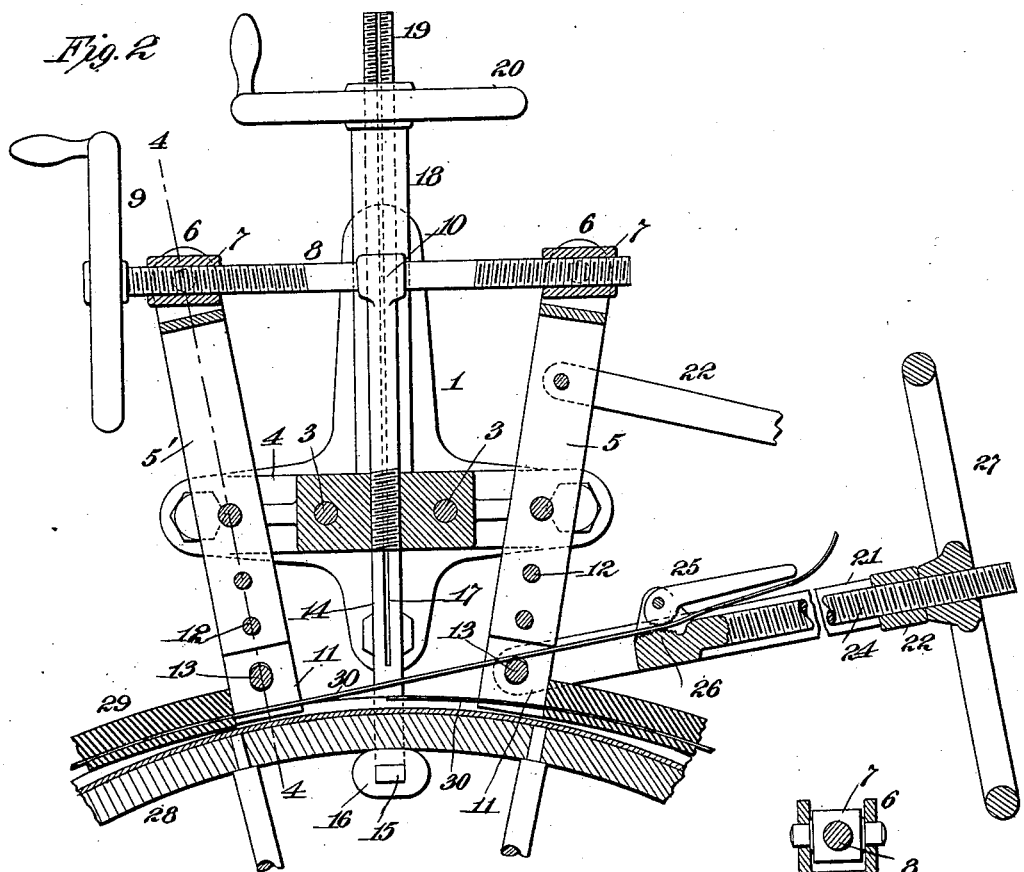
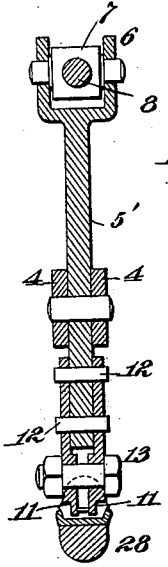
Witnesses:
Inventor
John H. Toole
by Dyer Edmonds
Att'ys.

UNITED STATES PATENT OFFICE.

JOHN H. TOOLE, OF CHICAGO, ILLINOIS, ASSIGNOR TO INTERNATIONAL AUTOMOBILE AND VEHICLE TIRE COMPANY, OF NEW YORK, N. Y.

APPARATUS FOR APPLYING TAPED OR WIRED TIRES TO CHANNELED VEHICLE-WHEELS.

SPECIFICATION forming part of Letters Patent No. 676,452, dated June 18, 1901.

Application filed September 10, 1900. Serial No. 29,496. (No model.)

*To all whom it may concern:*

Be it known that I, JOHN H. TOOLE, a citizen of the United States, residing at Chicago, in the county of Cook and State of Illinois, have invented a certain new and useful Improvement in Apparatus for Applying Taped or Wired Tires to Channeled Vehicle-Wheels, of which the following is a description.

My invention relates to an improved apparatus for applying to channeled vehicle-wheels rubber tires provided with a tape or a wire or wires therein, by which the tire will be held in position within the channeled rim; and the object of my invention is to provide an apparatus for the purpose wherein tires may be readily applied in position with sufficient stress to prevent objectionable creeping thereof with respect to the rim, while at the same time the tire will be placed under longitudinal compression, as is now the case, to prevent the opening and enlarging of any cuts which may be made in the tire in use.

In order that the invention may be better understood, attention is directed to the accompanying drawings, forming part of this specification, and in which—

Figure 1 is a side view of my improved apparatus, illustrating the manner of operating the same in securing a tire in place within the channeled rim of a wheel; Fig. 2, a longitudinal sectional view, on an enlarged scale, of the improved apparatus; Fig. 3, a plan view, and Fig. 4 an enlarged section on the line 4 4 of Fig. 1.

In all of the above views corresponding parts are represented by the same numerals of reference.

1 represents a suitable bracket or base, which is bolted or otherwise secured to a post or pillar 2. The base is provided with two studs 3 3, on which are mounted the parallel bars 4 4. Pivoted between these bars, at the ends thereof, are levers 5 5', the upper end of each of which is bifurcated, as shown at 6. Pivoted within the bifurcated portion 6 of each lever is a nut 7, and engaging said nuts is a screw-rod 8, adapted to be operated by a hand-wheel 9. Longitudinal movement of the screw-rod 8 is prevented by an arm 10, secured either between the bars 4 4 or to the base 1. Obviously the screw-threaded ends of the rod 8 are respectively right and left hand threaded, so that the turning of the rod will result in the simultaneous separation or bringing together of the upper ends of the levers 5 5'. Each lever is provided at its lower end with a chuck of any approved form for gripping the tape or wire with which the tire may be equipped. In its simplest form each chuck comprises a pair of gripping-fingers 11 11, secured to the lower end of each lever by means of pins 12 with sufficient flexibility as to be separated or brought together to grip the tape or wire and provided at their lower ends with a bolt and nut 13, by which such ends may be compressed to grip the tape or wire when desired. In order to hold the wheel with its channeled rim in the correct relation with respect to the chucks carried at the lower ends of the arms 5 5', I make use of a vertically-adjustable rod 14, having an outturned arm 15, provided, preferably, with an elastic covering 16, surrounding the same, so as not to injure the under side of the wheel-felly. The rod 14 is provided with a keyway 17, with which engages a key formed in a sleeve 18, carried by the base 1, whereby rotation of said rod with respect to the sleeve will be prevented. The upper end of the rod 14 is screw-threaded at 19, and engaging these threads is an operating-wheel 20, by means of which the arm 15 may be adjusted vertically to grip the wheel-felly between the elastic cushion 16 and the lower ends of the two chucks. Extending out from the lever 5, near the bottom thereof, are arms 21, arranged in pairs and pivoted upon the corresponding clamping-bolt 13. These arms 21 are illustrated as being suitably supported by braces 22. The arms 21 are secured at their outer ends to a sleeve 23, through which loosely passes a screw-threaded rod 24, carrying a clamp at its inner end. Said clamp may be of any suitable type, an ordinary alligator-jaw 25, coöperating with a block 26, being illustrated as a convenient embodiment thereof. Engaging the threaded rod 24 is a hand-wheel 27, by which the clamp 25 26 may be properly operated in practice.

Assuming the device to be used in applying to the channeled rim of a wheel 28 a tire 29 having a flat tape 30 therein, the operation will be as follows: The diameter of the channel of the wheel being ascertained, a strip or section of tire is first secured having a length sufficiently greater than the extent of such channel as may be desired in practice to secure the proper compression of the tire when applied in place within the rim. A section or strip of the tape 30 considerably longer than the length of tire thus cut is then taken and is inserted through the opening in the tire generally formed for its reception during the molding of the tire. This tape is then, as shown in Fig. 1, firmly gripped between the clamping-jaws 11, forming the chuck of the lever 5, by bringing said clamping-jaws together by operating the corresponding adjusting screw and nut 13. The wheel 28 is then inserted in place between the clamping jaws or chucks of the two levers, and the adjusting-wheel 9 is then operated to turn the screw-threaded rod 8 in the proper direction to adjust the levers 5 5', so that the latter will extend, preferably, in lines parallel with radii of the wheel 28. The free end of the tape 30 is then passed between the clamping-fingers 11 of the lever 5' at the left of Fig. 1, between the clamping-fingers of the lever 5, and is engaged by the clamp 25 26, so as to be firmly retained thereby. The operating-wheel 27 is then rotated so as to draw the clamp 25 26 toward the operator, thereby tightening the tape around the wheel-rim and firmly securing the tire in place therein. In this operation it will be observed that the free ends of the tire will abut against the clamping-jaws of the levers 5 5', so that the operation of applying stress to the tape also automatically applies compression to the tire. When sufficient stress has been applied to the tape, the clamping-jaws of the chuck of the lever 5' are firmly engaged with the tape, so as to hold the latter, and the tape is then cut off at the right point. The free ends between the chuck members of the levers 5 5' are then joined together in any suitable way, preferably by the ordinary process of lap-brazing. The chucks are then released from the tape, the adjusting-wheel 20 is rotated to lower the supporting-arm 15, and the wheel, with the tire applied thereto, is removed, after which the tire is allowed by its elasticity or is forced by hand to fill the gap on either side of the joint, so as to effectively conceal the latter.

Having now described my invention, what I claim as new, and desire to secure by Letters Patent, is as follows:

1. An improved apparatus for applying to the channeled rim of a wheel a tire having a metallic core, comprising in combination a pair of levers, a chuck at the lower end of each lever, means for adjusting the inclination of the levers with respect to the wheel, a frame carried solely by one of said levers, a clamp mounted in said frame, and means for operating the clamp, substantially as set forth.

2. An improved apparatus for applying to the channeled rim of a wheel a tire having a metallic core, comprising in combination a supporting-plate, a pair of levers pivoted thereto, a chuck at the lower end of each lever for engaging the core, a clamp movable in line with the chucks, means for operating said clamp, a vertically-adjustable arm carried by the supporting-plate for engaging with and holding the wheel-rim in contact with the chucks, and means for operating said arm, substantially as set forth.

3. An improved apparatus for applying to the channeled rim of a wheel a tire having a metallic core, comprising in combination a pair of levers, a chuck at the lower end of each lever for engaging the core, means for adjusting the inclination of said levers with respect to the wheel, a clamp movable in line with the chucks, means for operating said clamp, a vertically-adjustable arm for engaging with and holding the wheel-rim in contact with the chuck, and means for operating said arm, substantially as set forth.

This specification signed and witnessed this 23d day of August, 1900.

JOHN H. TOOLE.

Witnesses:
B. L. CHAPPELL,
J. R. O'BRIEN.